US007779879B2

(12) United States Patent
Liang

(10) Patent No.: US 7,779,879 B2
(45) Date of Patent: Aug. 24, 2010

(54) MACHINE FOR MAKING EXPANDABLE TWO-COLOR SLATS

(75) Inventor: Wen Ying Liang, Changhua County (TW)

(73) Assignee: Ching Feng Home Fashions Co., Ltd, Chuanghua County ( * ) Notice: Subject to any disclaimer, the term of this patent is extended or adjusted under 35 U.S.C. 154(b) by 336 days.

(21) Appl. No.: 12/076,372

(22) Filed: Mar. 18, 2008

(65) Prior Publication Data

US 2009/0236049 A1 Sep. 24, 2009

(51) Int. Cl.
*B23B 37/00* (2006.01)

(52) U.S. Cl. ........................ 156/351; 156/461; 156/494; 156/515; 156/555; 156/580.1

(58) Field of Classification Search ................. 156/351, 156/459, 461, 494, 510, 515, 530, 555, 580, 156/580.1, 580.2, 582, 583.1
See application file for complete search history.

(56) References Cited

U.S. PATENT DOCUMENTS 4,560,427 A * 12/1985 Flood ........................ 156/73.3
5,932,041 A * 8/1999 Dolling et al. ............. 156/73.3
6,673,176 B2 * 1/2004 Rupel .......................... 156/65

* cited by examiner

*Primary Examiner*—James Sells

(57) ABSTRACT

A machine for making two-color expandable salts includes a feeding unit to feed two strips of different colors to a combining unit which includes a cutting blade and a ultra-wave generator, the cutting blade cuts surplus from two sides of each of the two strips and the two strips are securely connected to each other along two respective sides thereof so as to form the expandable slat. A scrolling unit includes a scrolling wheel which to scroll the expandable slat from the combining unit. A control unit includes a programmable controller and multiple tension detection members which detect tension of the strips and the expandable slat, the tension is sent to the programmable controller which adjusts speed of the feeding wheels and scrolling wheel.

9 Claims, 11 Drawing Sheets

MACHINE FOR MAKING EXPANDABLE TWO-COLOR SLATS

FIELD OF THE INVENTION

The present invention relates to a machine for making expandable slats which are composed of two fabric strips of different colors.

BACKGROUND OF THE INVENTION

A conventional machine 7 for making expandable slats is shown in FIG. 10 and generally includes a plurality of rollers which feed a fabric strip 71 and the two sides 73 of the strip are folded toward a center of the strip and the folded strip 71 is then rolled by two pressing rollers 75 so as to form a slat that can be expanded by pulling the two sides of the strip. However, the two sides are easily tilted when folding so that the adverse rate is so high that increases the manufacturing cost.

FIG. 11 shows another machine 8 which feeds two strips 81 by two rollers 82 and the two strips 81 are arranged overlapped to each other. Two sides 811, 811*a* of the two strips 81 are then securely connected to each other by using ultra-sonic waves. The two overlapped strips are then expandable to form the expandable slat 84. Nevertheless, the two strips 81 are restricted to have the same colors.

The present invention intends to provide a machine for making expandable two-color slats and the machine is able to make the expandable slots composed of two strips of different colors.

SUMMARY OF THE INVENTION

The present invention relates to a machine for making two-color expandable slats, the machine comprises a feeding unit located at a front end of the machine and including two feeding wheels which feed two rolls of fabric strips toward a combining unit. The combining unit is installed on a base located at a mediate part of the machine and includes an operation portion which includes a cutting blade and a ultra-wave generator. The cutting blade cuts surplus from two sides of each of the two strips and the two strips are securely connected to each other along two respective sides thereof so as to form an expandable slat. A scrolling unit is located at a rear end of the machine and includes a scrolling wheel which is driven by another motor so as to scroll the expandable slat from the combining unit. A control unit includes a programmable controller and multiple tension detection members so as to detect tension of the strips and the expandable slat. The tension is sent to the programmable controller so as to adjust speed of the feeding wheels and scrolling wheel.

The primary object of the present invention is to provide a machine that makes the expandable slots composed of two strips of different colors.

Another object of the present invention is to provide a machine that effectively reduces adverse rate.

Yet another object of the present invention is to provide a machine that includes a surplus collector to collect the surplus cut from the strips.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 6-1 shows the cross sectional view taken along line b-b in FIG. 6;

FIG. 6-2 shows the cross sectional view taken along line c-c in FIG. 6;

FIG. 6-3 shows the cross sectional view taken along line d-d in FIG. 6;

DETAILED DESCRIPTION OF THE PREFERRED EMBODIMENT

Figure 1:
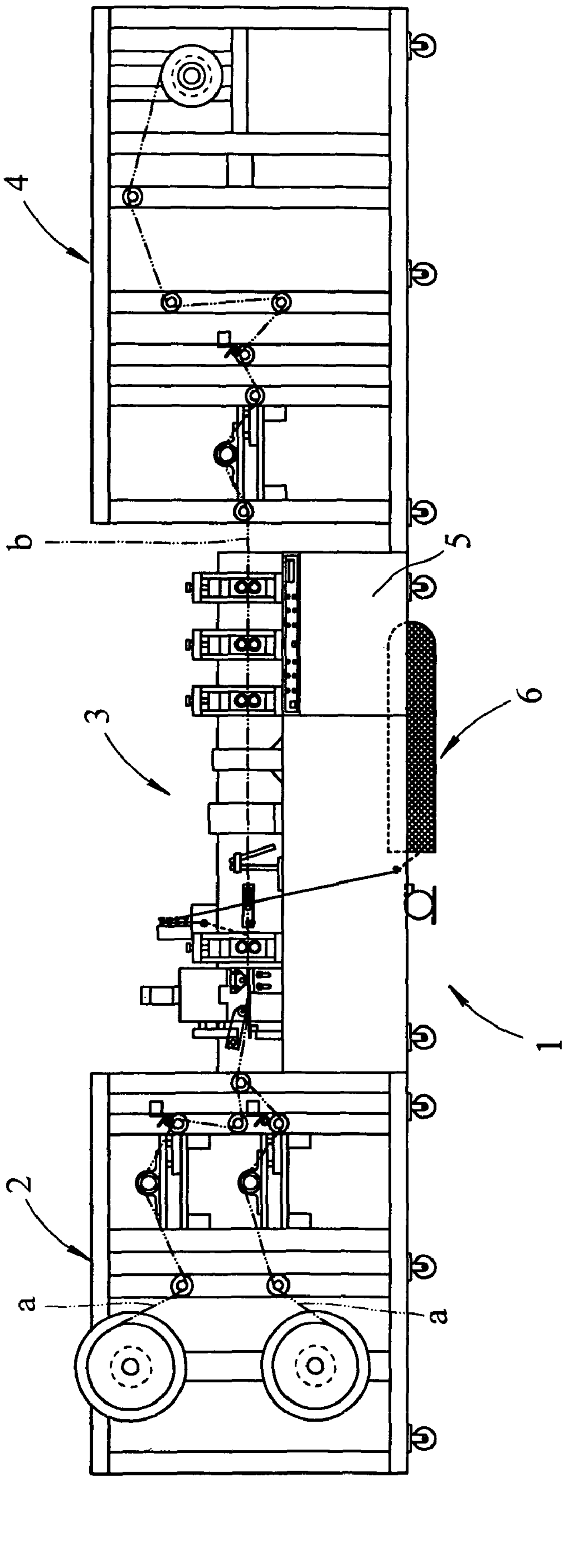
FIG. 1 is a side view of the machine of the present invention.
Figure 2:
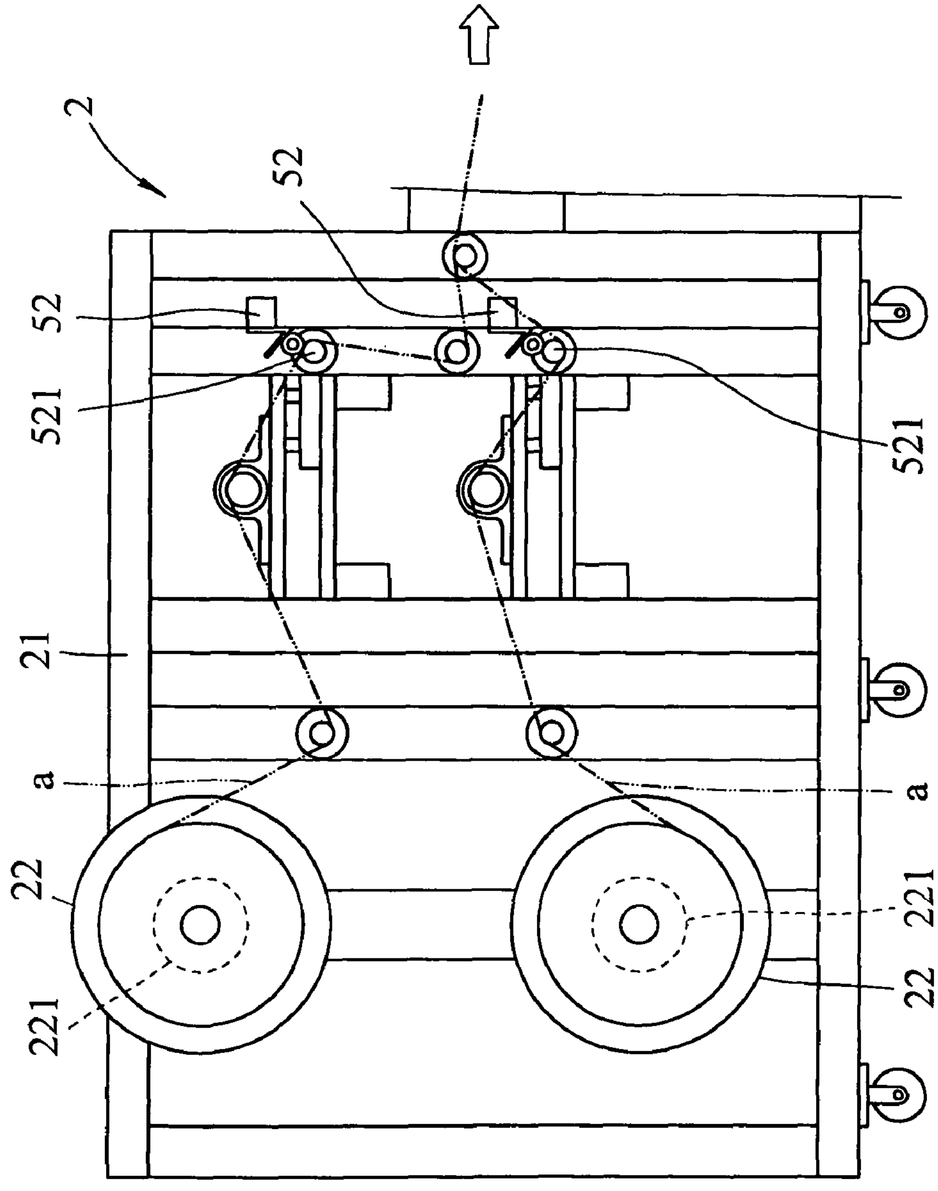
FIG. 2 is the feeding unit of the machine of the present invention.

Referring to FIGS. 1 and 2, the machine 1 for making two-color expandable slats "b" of the present invention comprises a feeding unit 2 located at a front end of the machine 1 and includes two feeding wheels 22 which are connected to a first frame 21 in which two rolls of fabric strips "a" are located. The two rolls of strips "a" are different colors and the two feeding wheels 22 are driven by two motors 221.

Figure 3:
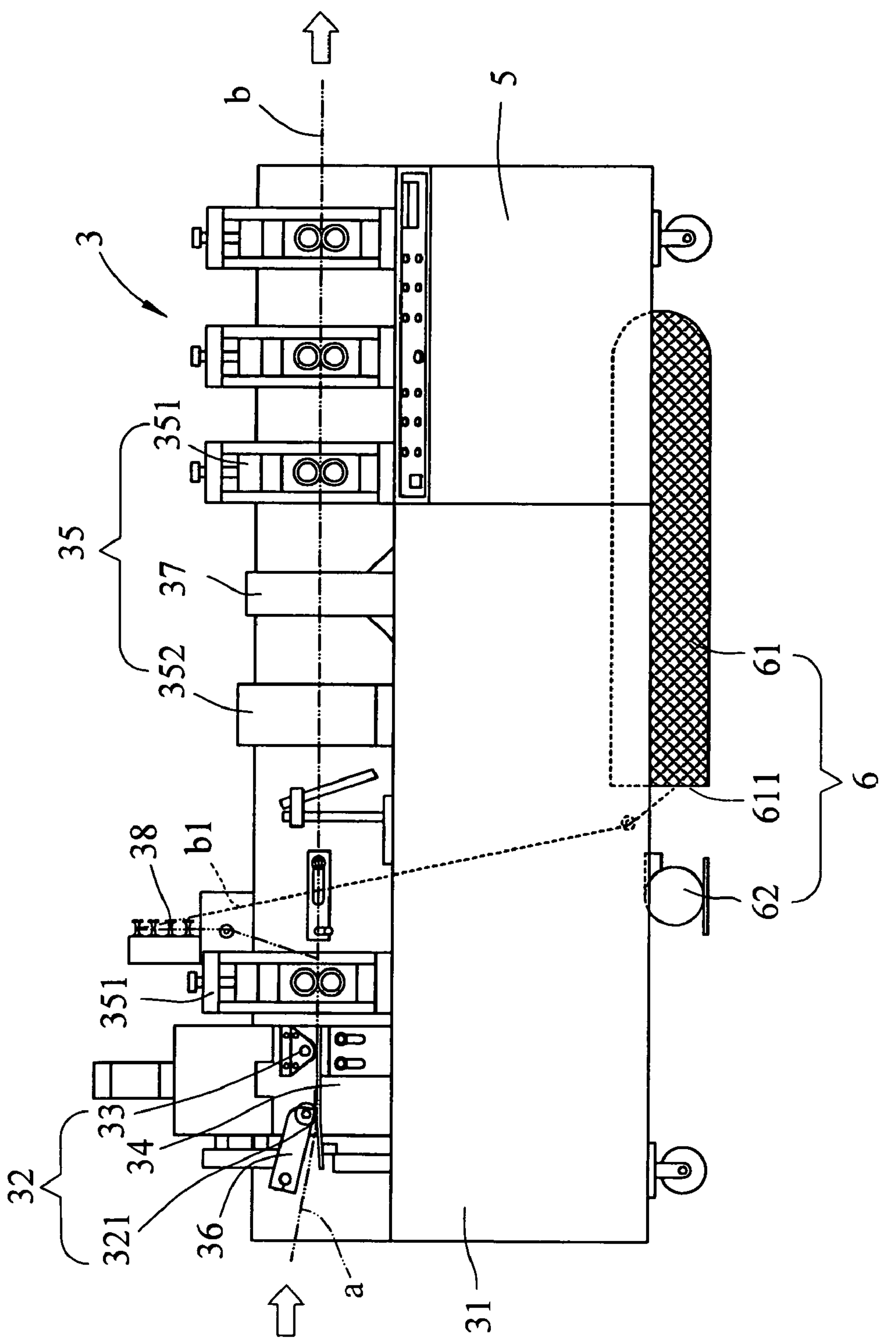
FIG. 3 is the combining unit of the machine of the present invention.
Figure 4:
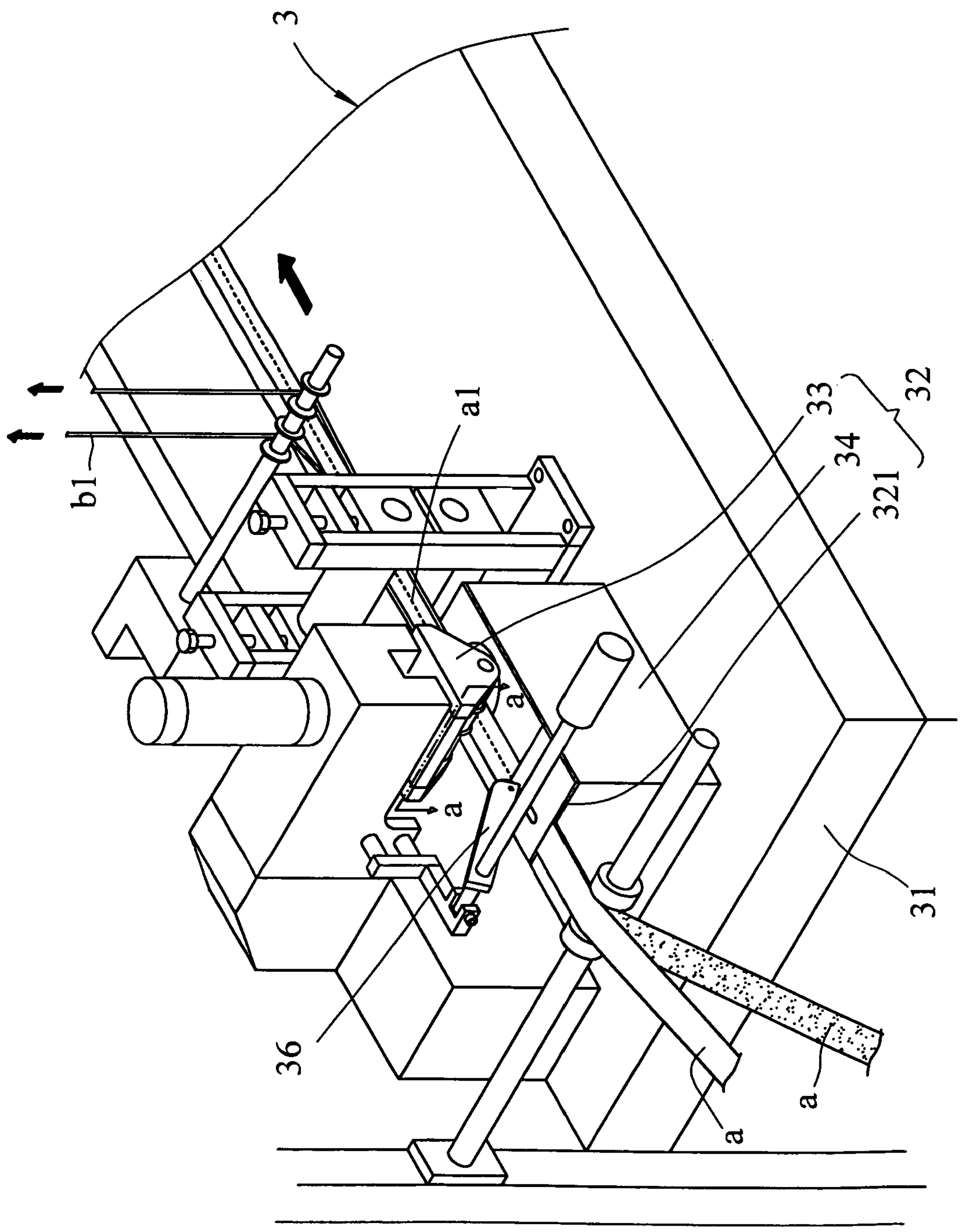
FIG. 4 is a perspective view of a part of the combining unit of the machine of the present invention.
Figure 5:
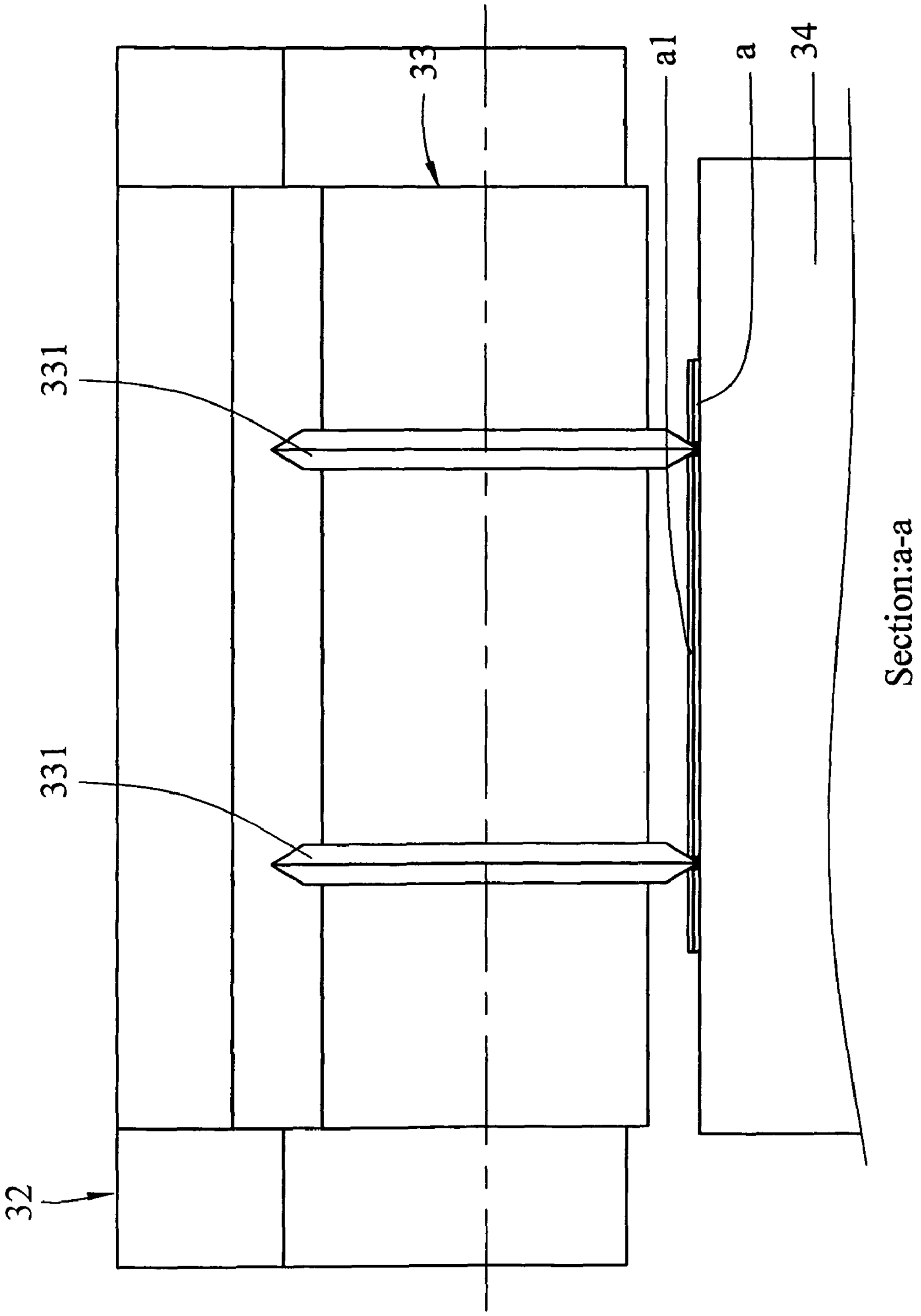
FIG. 5 is a cross sectional view taken along line a-a in FIG. 4.

As shown in FIGS. 3 and 4, a combining unit 3 is installed on a base 31 is located at a mediate part of the machine 1 and the combination unit 3 includes an operation portion 32 which includes a cutting blade 33 and a ultra-wave generator 34. The operation portion 32 includes an inlet 321 and a folding piece 36 is located at the inlet 321, the folding piece 36 makes a folding line "a1" along a center of the strips "a". Referring to FIG. 5, the cutting blade 33 is a cylindrical rod and includes two cutting edges 331. The two strips "a" are guided to the operation portion 32 and the cutting blade 33 cut surplus "b1" from two sides of each of the two strips "a" and the two strips "a" are securely connected to each other along two respective sides thereof by ultra-wave via the cutting ridges 331 so as to form an expandable slat "b".

Figure 6:
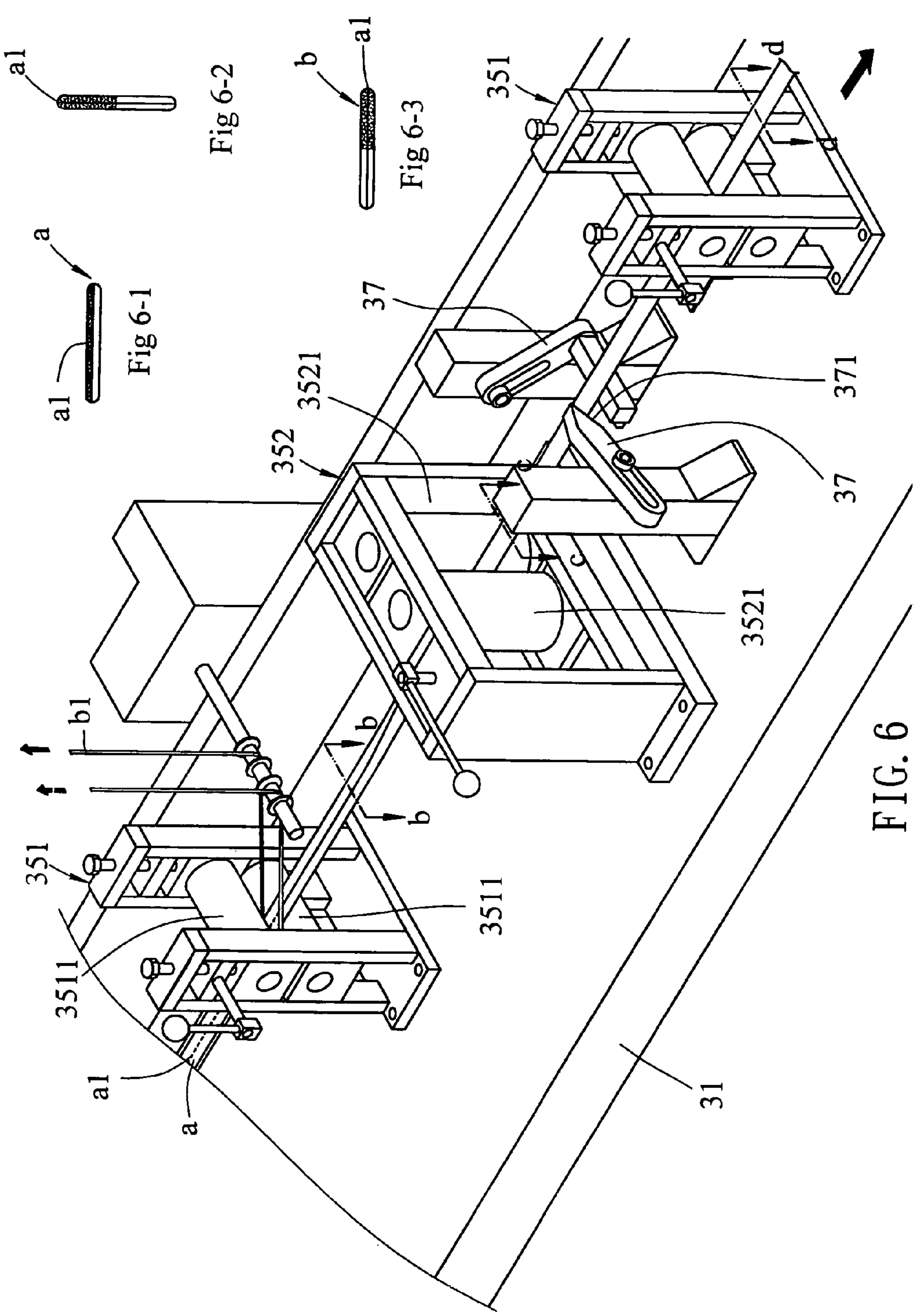
FIG. 6 is a perspective view of another part of the combining unit of the machine of the present invention.

Referring to FIG. 6, the combining unit 3 includes a flipping unit 35 which includes two horizontal pressing devices 351 and a vertical pressing device 352. Each of the horizontal pressing devices 351 includes two horizontal rollers 3511 and the vertical pressing device 352 includes two vertical rollers 3521, the expandable slat "b" is pressed between the two horizontal rollers 3511 to form the flat status as shown in FIG. 6-1 and then pressed between the two vertical rollers 3521 to form the flat status as shown in FIG. 6-2. The expandable slat "b" is then flipped 90 degrees by the flipping unit 35 which includes a plurality of auxiliary rods 37 are located between the vertical pressing device 352 and the second horizontal pressing device 351. Each auxiliary rod 37 includes an inclined surface 371 along which the expandable slat "b" is flipped 90 degrees. After the flipped expandable slat "b" is pressed by the horizontal rollers 3511 again, it forms the flat status as shown in FIG. 6-3.

Figure 7:
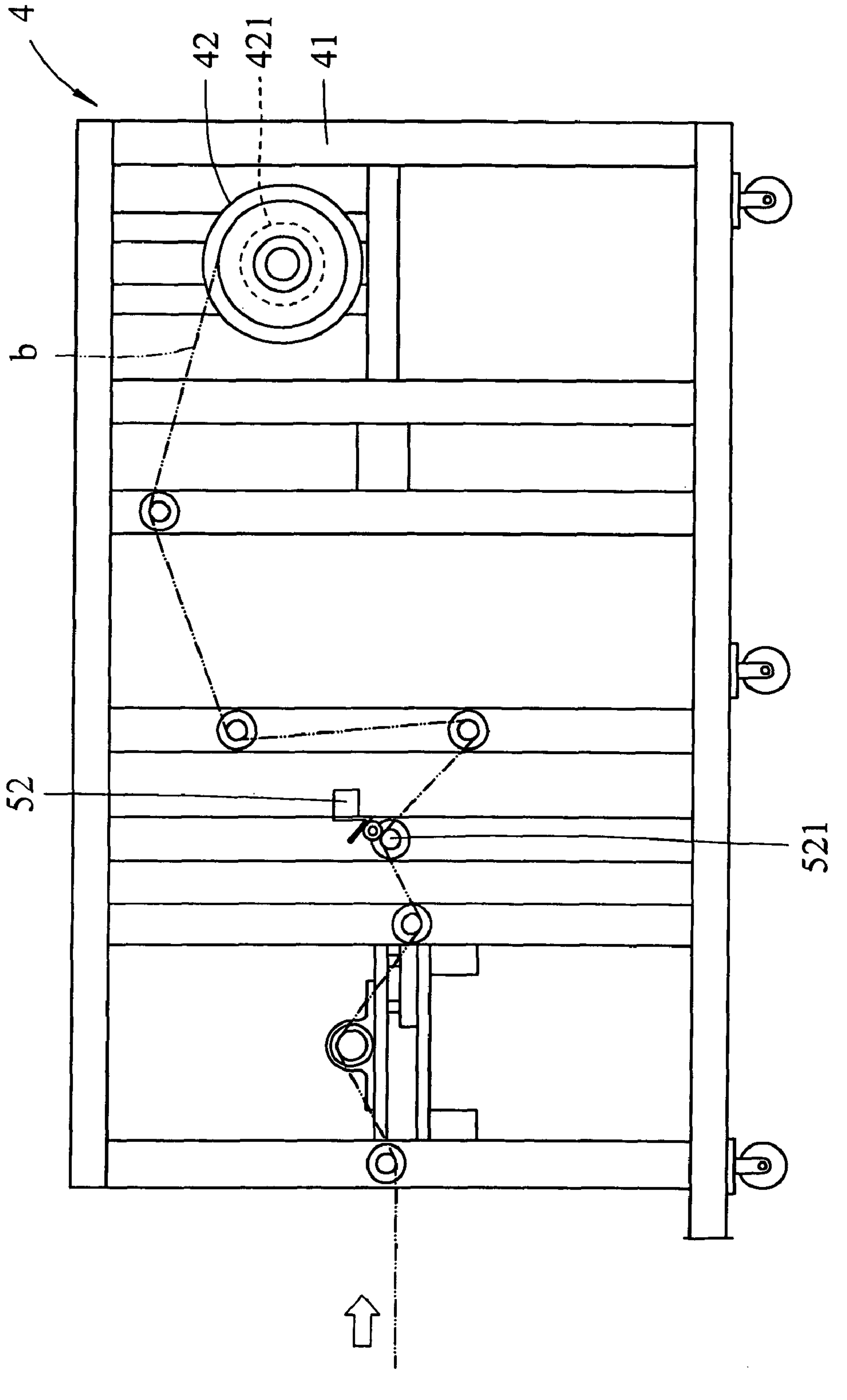
FIG. 7 is the scrolling unit of the machine of the present invention.

As shown in FIG. 7, a scrolling unit 4 is located at a rear end of the machine 1 and includes a scrolling wheel 42 which is driven by another motor 421 so as to scroll the expandable slat "b" from the combining unit 3.

Figure 8:
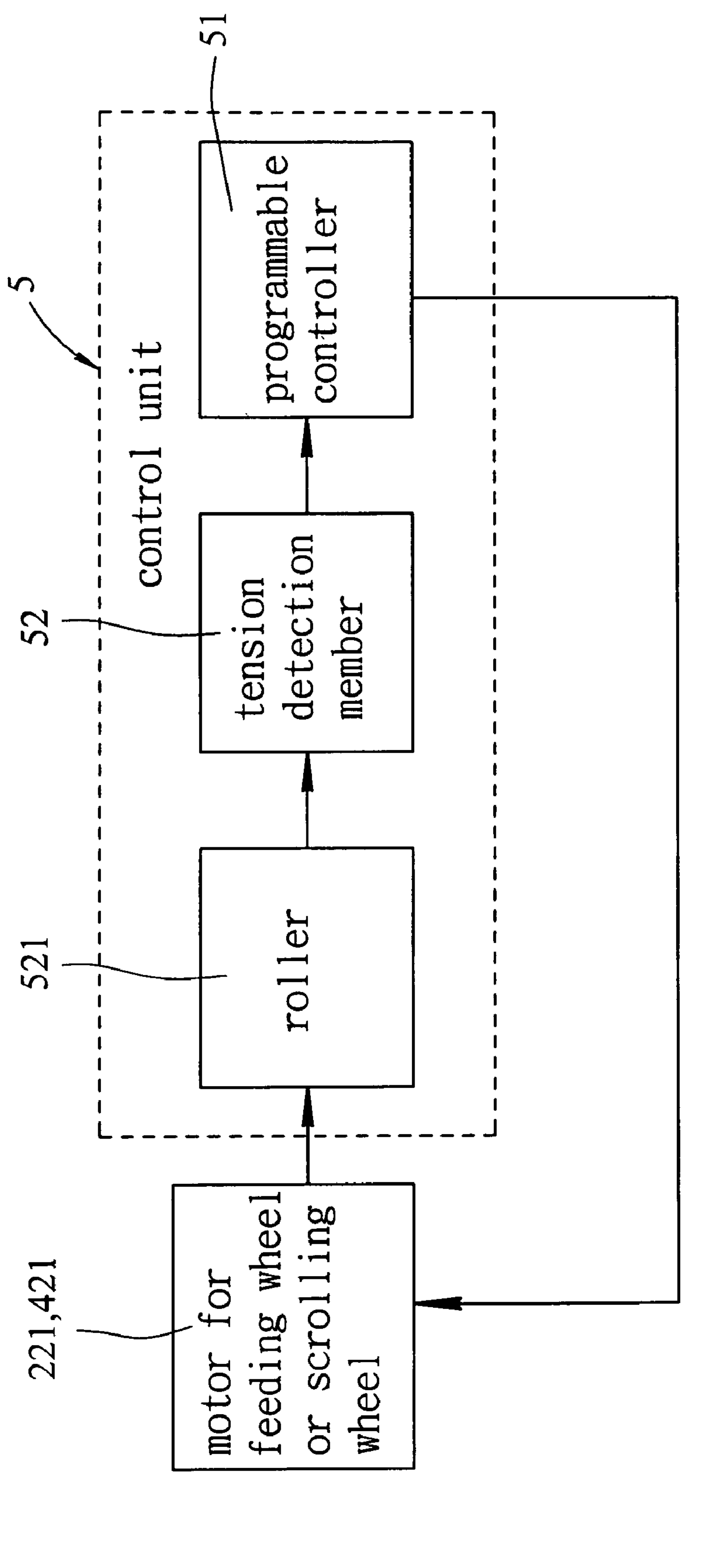
FIG. 8 shows the flow chart of the control unit of the machine of the present invention.

As shown in FIG. 8, a control unit 5 includes a programmable controller 51 and multiple tension detection members 52 which are located at the front and rear ends of the machine 1 so as to detect tension of the strips "a" and the expandable slat "b" when the strips "a" and the expandable slat "b" roll over the rollers 521. The data of the tension is then sent to the programmable controller 51 which adjusts speed of the motors 221, 421 of the feeding wheels 22 and scrolling wheel 42.

Figure 9:
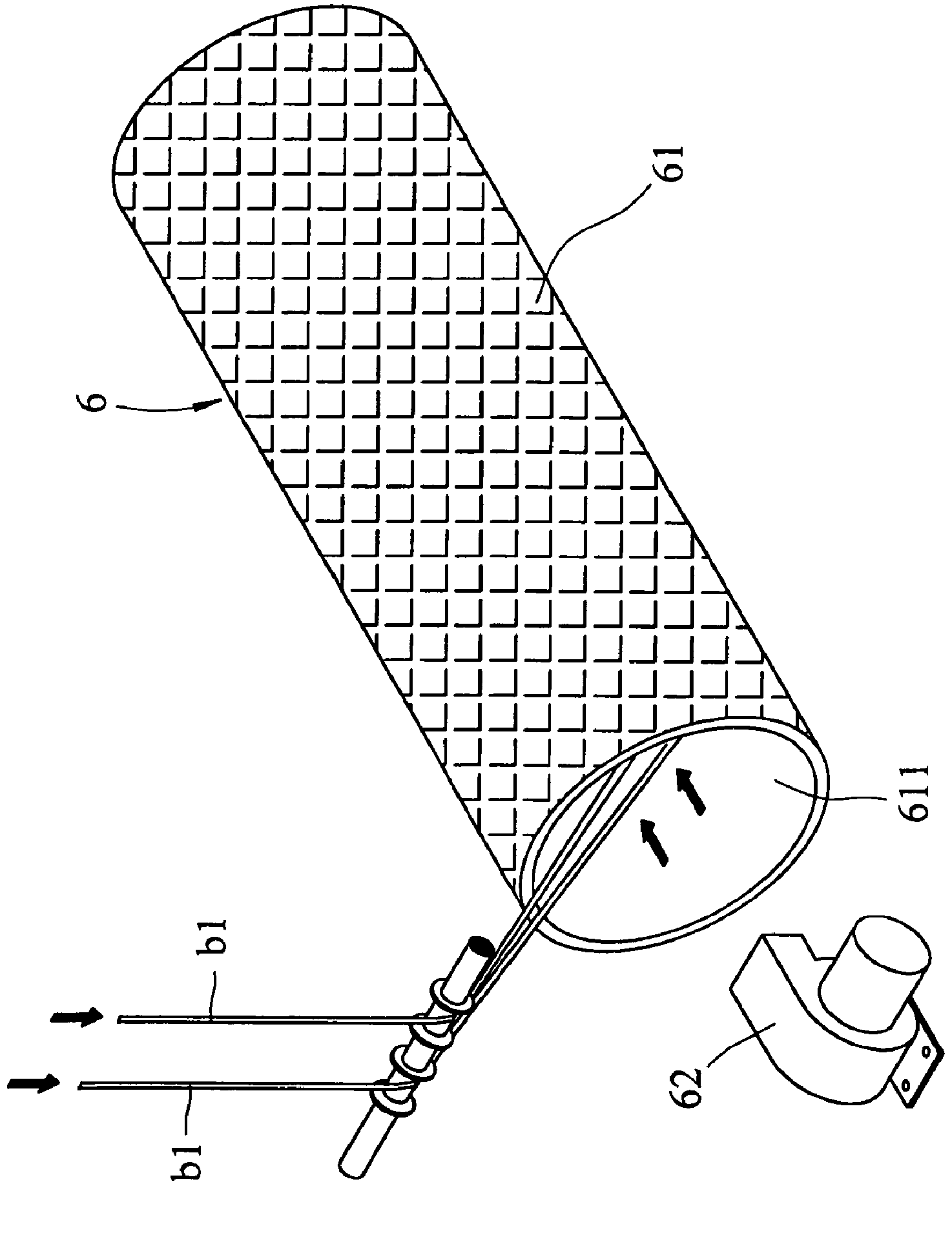
FIG. 9 is the surplus collector of the machine of the present invention.
Figure 10:
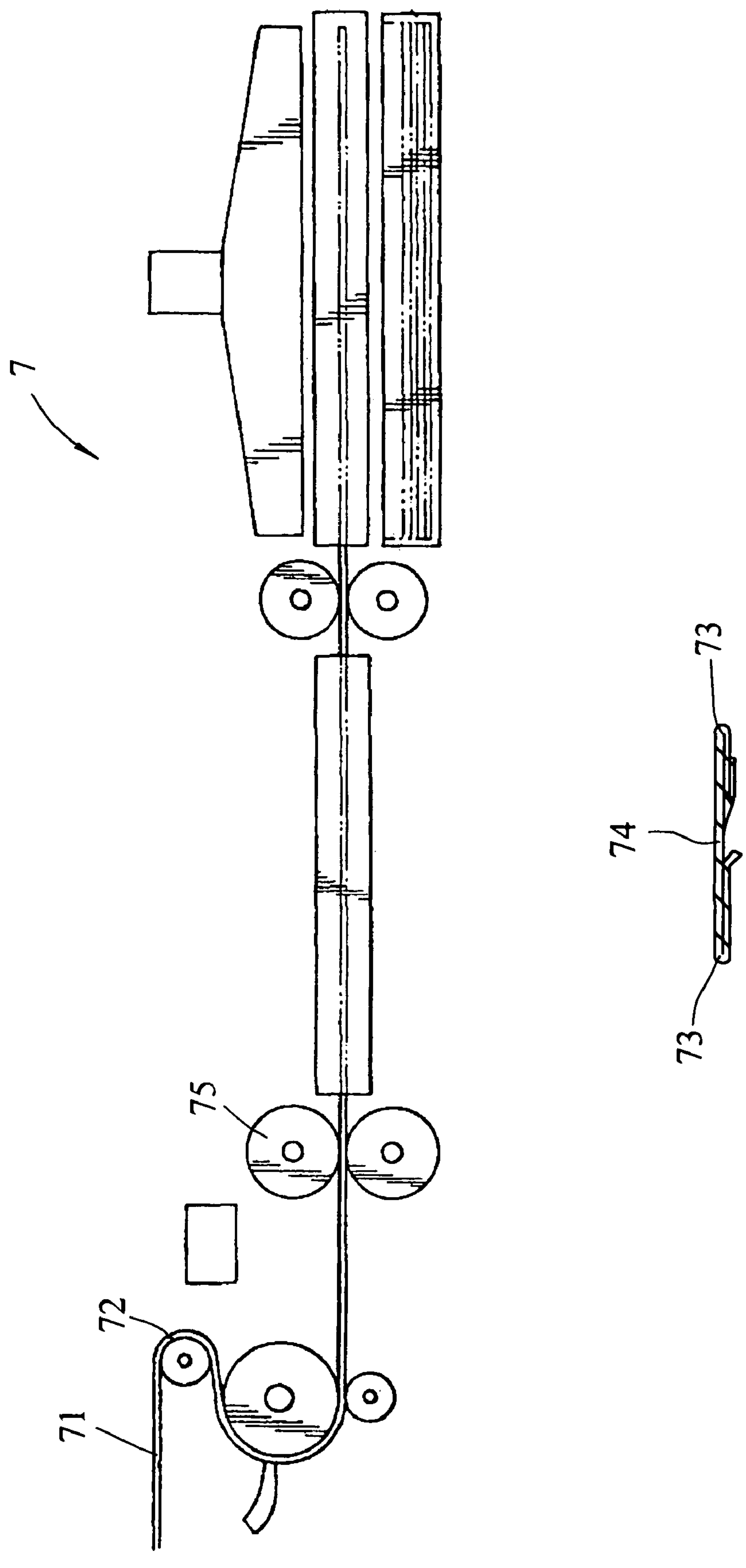
FIG. 10 PRIOR ART
FIG. 10 shows a first conventional machine for making expandable slats.
Figure 11:
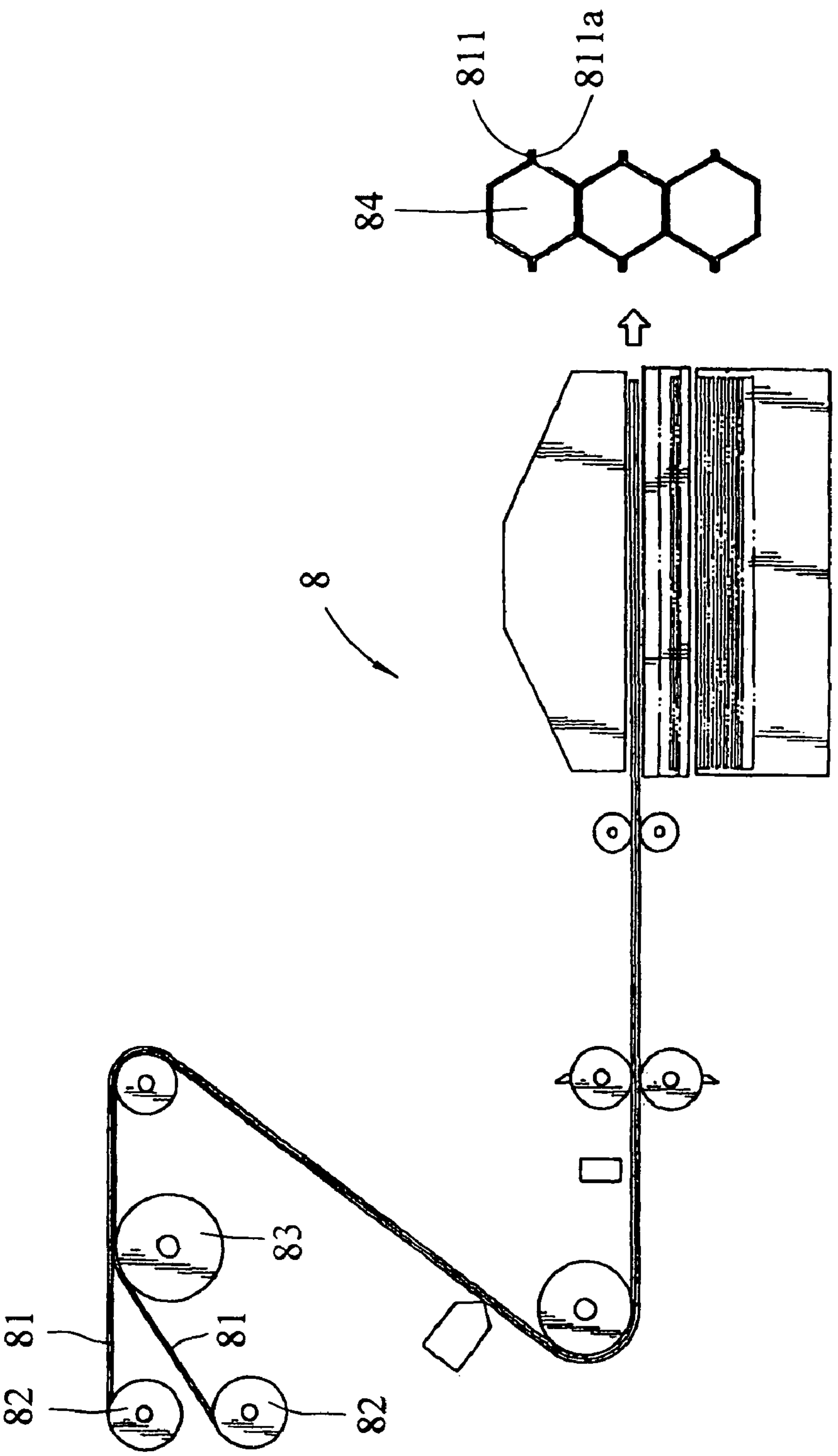
FIG. 11 PRIOR ART
FIG. 11 shows a second conventional machine for making expandable slats.

As shown in FIG. 9, a surplus collector 6 is located beneath the combining unit 3 and the surplus "b1" is collected in the surplus collector 6. It is noted that a plurality of guide wheels 38 are located beside the operation portion 32 and guide the surplus "b1" toward the surplus collector 6. The surplus collector 6 includes a collection box 61 and a blower 62 which is located at an open end 611 of the collection box 61 so as to blow the surplus "b1" from the combining unit 3 into the collection box 61. The collection box 61 is made by netted material to assist the air flow from the blower 62.

While we have shown and described the embodiment in accordance with the present invention, it should be clear to those skilled in the art that further embodiments may be made without departing from the scope of the present invention.

What is claimed is:

1. A machine comprising:

a feeding unit located at a front end of the machine and including two feeding wheels which are connected to a first frame in which two rolls of fabric strips are located, the two feeding wheels driven by two motors;

a combining unit installed on a base which is located at a mediate part of the machine, the combination unit including an operation portion which includes a cutting blade and a ultra-wave generator, the cutting blade cutting surplus from two sides of each of the two strips and the two strips being securely connected to each other along two respective sides thereof so as to form an expandable slat;

a scrolling unit located at a rear end of the machine and including a scrolling wheel which is driven by another motor so as to scroll the expandable slat from the combining unit;

a control unit including a programmable controller and multiple tension detection members which are located at the front and rear ends of the machine so as to detect tension of the strips and the expandable slat, the tension being sent to the programmable controller which adjusts speed of the motors of the feeding wheels and scrolling wheel.

2. The machine as claimed in claim 1, wherein the combining unit includes a flipping unit which includes at least one horizontal pressing device and at least one vertical pressing device, the strips are pressed and flipped 90 degrees by the combining unit.

3. The machine as claimed in claim 2, wherein the operation portion includes an inlet and a folding piece is located at the inlet, the folding piece makes a folding line along a center of the strips.

4. The machine as claimed in claim 3, wherein the flipping unit includes a plurality of auxiliary rods which are located between the at least one horizontal pressing device and at least one vertical pressing device, each auxiliary rod includes an inclined surface along which the expandable slat is flipped 90 degrees.

5. The machine as claimed in claim 1, wherein the cutting blade is a cylindrical rod and includes two cutting edges so as to cut the surplus of the strips and securely connect the two sides of the strips by ultra-wave.

6. The machine as claimed in claim 1, wherein a surplus collector is located beneath the combining unit and the surplus is collected in the surplus collector.

7. The machine as claimed in claim 6, wherein a plurality of guide wheels are located beside the operation portion and guide the surplus toward the surplus collector.

8. The machine as claimed in claim 7, wherein the surplus collector 6 includes a collection box and a blower which is located at an open end of the collection box so as to blow the surplus from the combining unit into the collection box.

9. The machine as claimed in claim 8, wherein the collection box is made by netted material.

* * * * *